(12) United States Patent
Russ

(10) Patent No.: US 8,645,909 B2
(45) Date of Patent: Feb. 4, 2014

(54) EVALBINDING EXTENSION

(75) Inventor: Jonathan B. Russ, Seattle, WA (US)

(73) Assignee: IdentityMine, Inc., Seattle, WA (US)

( * ) Notice: Subject to any disclaimer, the term of this patent is extended or adjusted under 35 U.S.C. 154(b) by 1213 days.

(21) Appl. No.: 11/740,069

(22) Filed: Apr. 25, 2007

(65) Prior Publication Data

US 2008/0195647 A1 Aug. 14, 2008

Related U.S. Application Data

(60) Provisional application No. 60/888,932, filed on Feb. 8, 2007.

(51) Int. Cl.
*G06F 9/44* (2006.01)
*G06F 9/45* (2006.01)

(52) U.S. Cl.
USPC ............ 717/106; 717/107; 717/120; 717/143

(58) Field of Classification Search
None
See application file for complete search history.

(56) References Cited

U.S. PATENT DOCUMENTS

| | | | |
|---|---|---|---|
| 7,464,386 B2 * | 12/2008 | Millington et al. | 717/120 |
| 7,519,969 B2 * | 4/2009 | Bent et al. | 719/315 |
| 7,523,129 B1 * | 4/2009 | Bent et al. | 1/1 |
| 7,577,938 B2 * | 8/2009 | Bent et al. | 717/113 |
| 7,584,194 B2 * | 9/2009 | Tuttle et al. | 1/1 |
| 7,721,262 B2 * | 5/2010 | Reinhardt | 717/124 |
| 7,779,395 B1 * | 8/2010 | Chotin et al. | 717/137 |
| 7,793,255 B1 * | 9/2010 | Kawaguchi et al. | 717/120 |
| 7,818,690 B2 * | 10/2010 | Srivastava | 715/853 |
| 8,281,287 B2 * | 10/2012 | Finocchio | 717/106 |
| 8,381,172 B2 * | 2/2013 | Koskimies | 717/106 |
| 2002/0073399 A1 * | 6/2002 | Golden | 717/143 |
| 2004/0230911 A1 * | 11/2004 | Bent et al. | 715/762 |
| 2005/0188349 A1 * | 8/2005 | Bent et al. | 717/106 |
| 2005/0188350 A1 * | 8/2005 | Bent et al. | 717/106 |
| 2006/0089941 A1 * | 4/2006 | Jenni et al. | 707/102 |
| 2006/0230011 A1 * | 10/2006 | Tuttle et al. | 706/62 |
| 2006/0259898 A1 * | 11/2006 | Reinhardt | 717/124 |
| 2008/0127060 A1 * | 5/2008 | Reamey | 717/106 |
| 2012/0167039 A1 * | 6/2012 | Williams et al. | 717/107 |

OTHER PUBLICATIONS

Cong Zhang et al., ModeIML a Markup Language for Automatic Model Synthesis, 2007 IEEE, pp. 317-322, <http://ieeexplore.ieee.org/stamp/stamp.jsp?tp=&arnumber=4296640&tag=1>.*

Judith Bishop et al., Cross-Platform Development Software that Lasts, 2006 IEEE, pp. 26-35, <http://ieeexplore.ieee.org/stamp/stamp.jsp?tp=&arnumber=1707631>.*

Judith Bishop, Multi-platform User Interface Construction—A Challenge for Software Engineering-in-the-Small, 2006 ACM, pp. 751-760, <http://dl.acm.org/citation.cfm?id=1134404>.*

(Continued)

*Primary Examiner* — Thuy Dao
*Assistant Examiner* — Cuong V Luu
(74) *Attorney, Agent, or Firm* — Steven C. Stewart

(57) ABSTRACT

EvalBinding, a markup extension for the Windows Presentation Foundation (WPF) extensible application markup language (XAML), allows a WPF dependency property value to be dynamically bound to a markup based code expression that is dependent upon one or more other Common Language Runtime (CLR) property values. A change in any of these dependent values causes a re-evaluation of the markup based code expression and consequently, an update to the bound property value.

17 Claims, 3 Drawing Sheets

(56) References Cited

OTHER PUBLICATIONS

M. Goedicke et al., Towards a Formal Specification Method for Graphical User Interfaces Using Modularized Graph Grammars, 1996 IEEE, pp. 56-65, <http://ieeexplore.ieee.org/stamp/stamp.jsp?tp=&arnumber=501147>.*

Tai-Yeon Ku et al., Device-Independent Markup Language, 2005 IEEE, 5 pages, <http://ieeexplore.ieee.org/stamp/stamp.jsp?tp=&arnumber=1515455>.*

H. Arno Jacobsen, Modeling Interface Definition Language Extensions, 2000 IEEE, pp. 242-251, <http://ieeexplore.ieee.org/stamp/stamp.jsp?tp=&arnumber=891373>.*

* cited by examiner

EVALBINDING EXTENSION

PRIORITY

This application claims the benefit of U.S. provisional application No. 60/888,932, filed on Feb. 8, 2007.

BACKGROUND

Microsoft Windows Presentation Foundation (WPF) is Microsoft's presentation subsystem for .NET 3.0, which is a key part of the Microsoft Windows Vista operating system. In WPF, User Interface (UI) creation is done in conjunction with a new declarative markup language called extensible application markup language (XAML). XAML, combined with WPF, allows creation of an expression that controls the appearance of document layouts and controls how objects are bound to data regardless of where the application will be used.

In WPF, a "binding" is used to bind a value of a target dependency property on a target dependency object to one or more dynamic property values on other Common Language Runtime (CLR) objects. This is traditionally accomplished within XAML by using one or more native binding or multibinding objects. These native binding objects are implemented through markup extension classes. Traditionally specialized code must be written to handle changes in the dependency objects and to implement custom value converters to evaluate the expressions. Writing the specialized code requires that a developer implement custom value converters to evaluate expressions, thereby increasing design time.

SUMMARY

EvalBinding is a markup extension for XAML. The EvalBinding extension allows a WPF dependency property value to be dynamically bound to a markup based code expression that is dependent upon other Common Language Runtime (CLR) property values. A change in any of these dependent values causes a re-evaluation of the markup based code expression and consequently, an update to the bound property value. This allows expressions to be used directly in the markup extension, thereby alleviating the need for a developer to implement custom value converters to evaluate expressions.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

This document relates to the design of the EvalBinding Extension for Windows Presentation Foundation (WPF), available from Microsoft of Redmond, Wash. WPF may be operated on an electronic computing device including a computer having memory. Described herein is an EvalBinding markup extension, which introduces the ability to establish a binding using a "markup based code expression" that is dependent on other CLR property values, herein referred to as subbindings. The markup based code provides the ability to include the code expression in markup inside of a binding. The result of the evaluated markup based code expression becomes the value of the bound property. Upon resolution of the EvalBinding markup expression, a native MultiBinding object is created by the EvalBinding object and applied to the binding target. As with any markup expression, this occurs within a ProvideValue routine that is inherited from the MarkupExtension base class as part of WPF.

Figure 1:
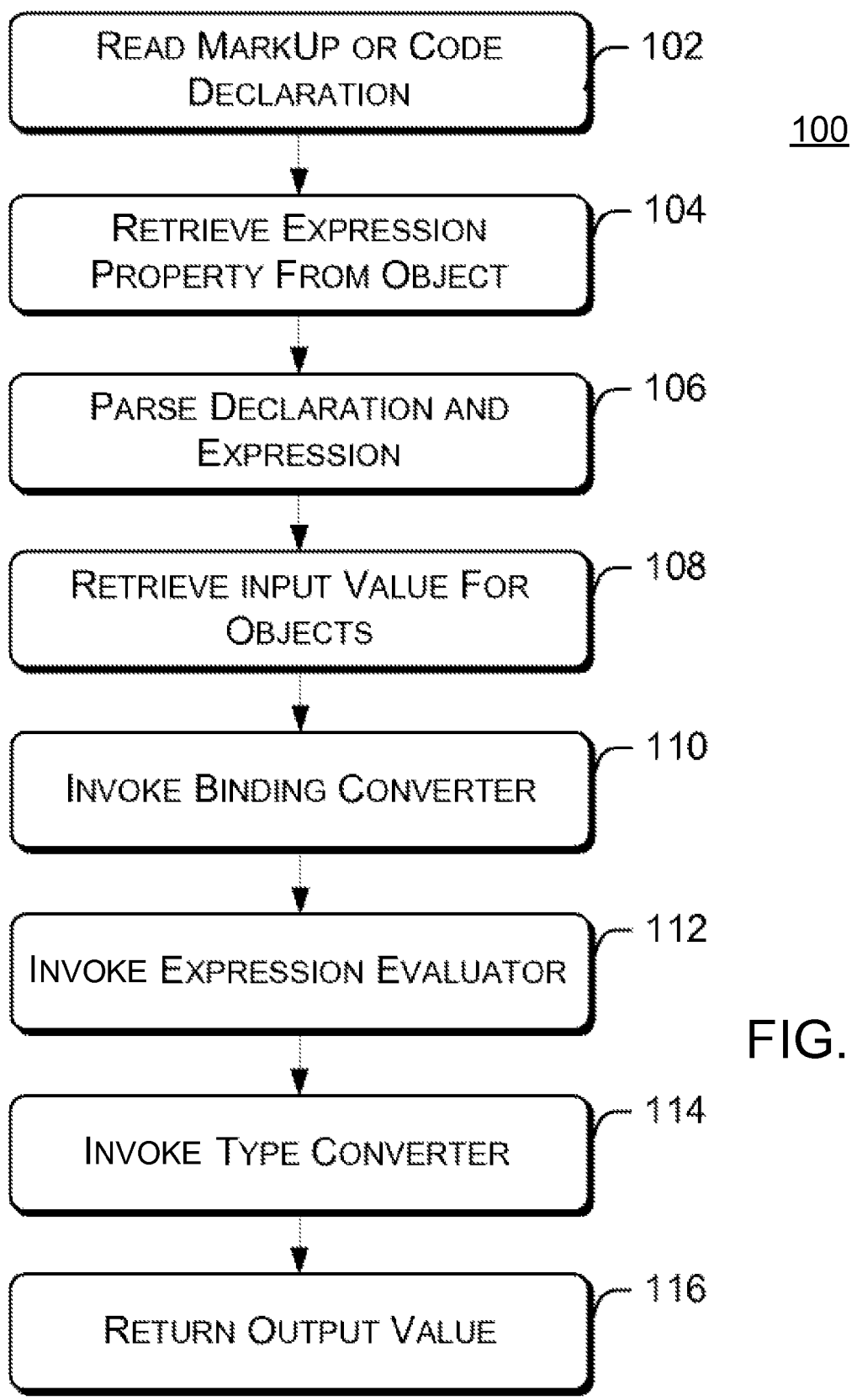
FIG. 1 is a diagram of an exemplary process used to implement an EvalBinding Markup Extension.

Illustrated in FIG. 1, is a process 100 for invoking an EvalBinding extension. The exemplary process in FIG. 1 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to computing device 200 of FIG. 2, although it may be implemented in other system architectures.

The process 100 begins by reading a markup or code declaration in block 102. An exemplary XAML Markup Declaration to establish an EvalBinding, is as follows:

```
<Rectangle Width= "{im:EvalBinding
[RootGrid.Background.Colour.B]*[MySlider.Value]}" />
```

An illustrated code declaration may be as follows:

```
rectangle.Width = new EvalBinding("[RootGrid.Background.Colour.B]*
[MySlider.Value]}" />
```

In block 104, an expression property is retrieved from the object. For the illustrated code declaration the expression "[RootGrid.Background.Color.B]*[MySlider.Value]" would be retrieved.

In block 106, the retrieved expression would be parsed to create a MultiBinding object that includes a parsed expression and a collection of SimplePath objects. This MultiBinding object is applied to a target WPF dependency property. The subbindings, if any, of the created MultiBinding object consist of the SimpleBinding objects created from the EvalBinding's internal SimplePaths collection. Once created, the MultiBinding is connected to an internal multi-value converter herein referred to as an EvalBinding Converter. This converter is created using the parsed expression and the SimpleBindings collection. The EvalBinding Converter is responsible for performing the expression evaluation. The values of the SimpleBinding objects act as input parameters into the parsed expression.

For this example, the parsed binding object and subbindings would be set as follows:
Expression="{0}*{1}";

SubBindings [0]=new SimpleBinding
("[RootGrid.Background.Color.B]")
SubBindings [1]=new SimpleBinding("MySlider.Value]");

The SimplePath objects are used to create one-way SimpleBinding objects. Details of the SimpleBinding object creation is explained in U.S. patent application Ser. No. {t.b.d.} titled SimpleBinding Extension, and filed on Apr. 25, 2007, and U.S. provisional patent application No. 60/888,933, filed on Feb. 8, 2007, which are hereby incorporated by reference. A new MultiBinding may be created by adding the SimpleBinding objects to its Bindings collection.

In block 108 the input values for the objects referenced in the subbindings are received by the EvalBinding Converter. This occurs when the value of a subbinding changes. Such changes may occur when the source property of a subbinding is altered via a setter (such as a CLR property's "set" accessor or a WPF dependency object's SetValue method). In this example, the "B" value of the color property of the background property of the element named "RootGrid" and the value property of the element named "MySlider" would be received by the EvalBinding Converter.

In block 110, the EvalBinding Converter is invoked. The parsed expression, passed to the EvalBinding Converter in its constructor, is a string that represents a parameter-based code expression. It may or may not include index-based parameters. When present, the integer value of a parameter represents the index of its relevant SimpleBinding within the MultiBinding's collection of the subbindings. The EvalBinding Converter invokes an expression evaluator and passes it the expression and the input values for the subbindings.

In block 112, the expression evaluator is invoked. The expression evaluator evaluates the expression using a Jscript interpreter. After evaluating the Jscript expression, the interpreter returns the results. In the expression evaluator, a public JScript routine named Eval may be used to evaluate the expression. This Eval function is provided by Microsoft Inc. within the .NET Framework.

There are many other equally valid approaches to expression evaluation. Other methods might include dynamically compiling an in-memory assembly or using a custom evaluation function that parses the code expression and performs the given operations.

Upon evaluation of the expression, a custom type conversion routine is used in block 114 to ensure that the resultant bound value is of the correct type. This routine attempts to convert the value for the result of the interpreter using a default type converter. If no default type converter exists, a simple CLR typecast is used as the format for the final result.

In block 116 the final result is converted to a System.Double value or a simple CLR typecast may be supplied to the WPF system.

The EvalBinding can be used in XAML using the condensed, typical form shown in (Equation 1) as follows:

<Rectangle Height="100" Fill="Blue" Stroke="White"
StrokeThickness="1" Width="{im:EvalBinding
[RootGrid.Background.Color.B] * [MySlider.Value]}"
/>         (Equation 1)

Or, as would be expected with any markup extension, the XAML can be fully expanded, and the code expression and simple paths can be added explicitly, as follows:

<Rectangle Height="100" Fill="Blue" Stroke="White"
StrokeThickness="1">
<Rectangle.Width>
<im:EvalBinding Expression="{ }{0}*{1}">
<im:SimplePath SPath="[RootGrid.Background.Color.B]" />
<im:SimplePath SPath="[MySlider.Value]" />
</im:EvalBinding>
</ Rectangle.Width>
</ Rectangle >

In the expanded form of the example EvalBinding, it is necessary to prefix the Expression property with "{ }". This expression property is a XAML convention that instructs the parser to treat the remainder of the string as a literal string. Without this prefix, the parser will try to interpret "{0}" and "{1}" as additional markup extensions, and will consequently fail.

Figure 2:
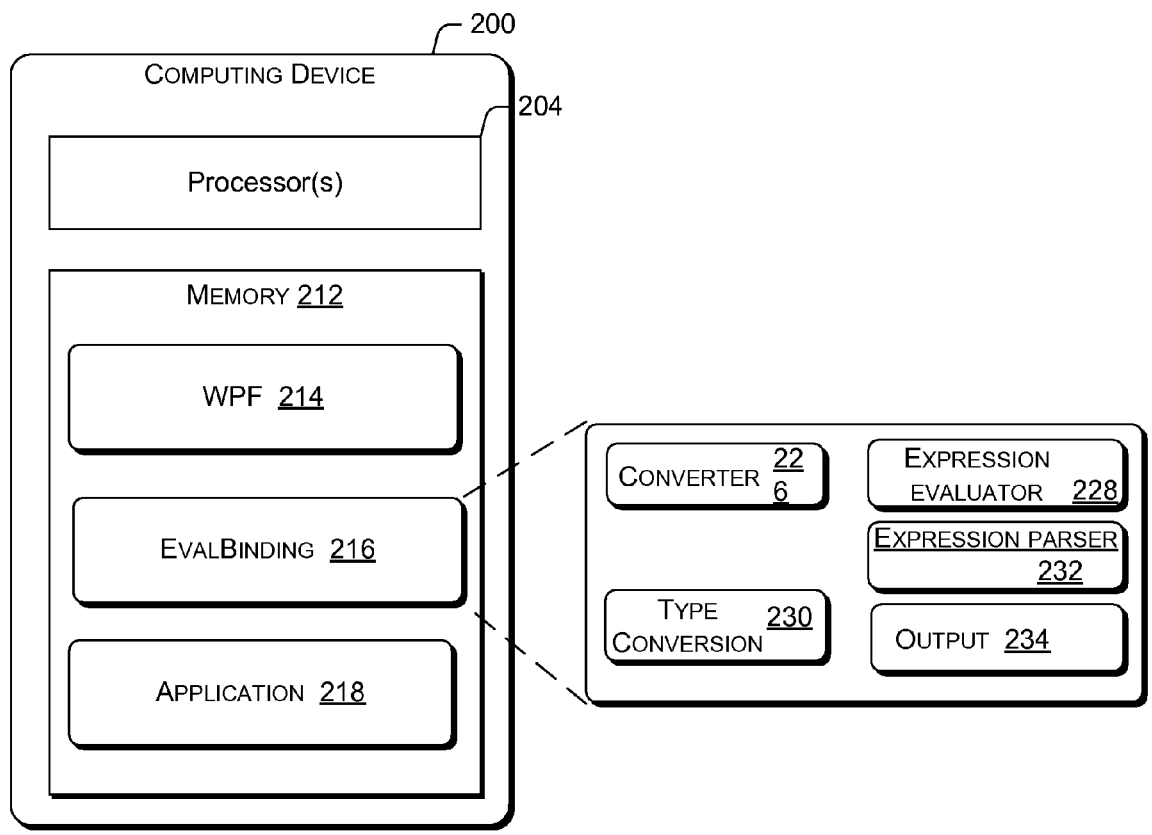
FIG. 2 is a block diagram depicting selected modules in a computer device that invokes the EvalBinding markup extension.

In FIG. 2 are illustrated selected modules in computing device 200 using process 100 shown in FIG. 1. Computing device has process capabilities and memory suitable to store and execute computer-executable instructions. In one example, computing device 200 includes one or more processors 204 and memory 212.

The memory 212 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 212 of the computing device 202 is Windows Presentation Foundation 214 with an operating system (Such as a Window® based operating system), an EvalBinding extension 216 and a software/design application 218. EvalBinding 216 includes converter 226, expression evaluator 228, type converter 230, Expression parser 232 and an output value 234 or result.

Converter 226 receives property values and invokes the expression evaluator by passing it the expression and the input values as defined by the collection of SimpleBindings. Expression evaluator 228 evaluates the expression using an interpreter, such as a JScript interpreter, and returns the resulting evaluation to the type converter. Type converter 230 attempts to convert the result of the expression into a value of System.Double type is provided by the Microsoft .NET Framework using either a type converter or a CLR typecast.

Expression parser 232 parses the binding object into an expression and into subbindings that are used in the expression. The output 234 is stored in memory and supplied to the WPF application.

Example

The following markup declaration and the displays 300, illustrated in FIGS. 3a-3d, represent one typical usage scenario for an EvalBinding in XAML. In this example, the user chooses one of colors 306-310 (Herein referred to as property "Color") and a position of slider 316 on a display 312 of computer 304 using a connected input device (not shown). The computer 304 of FIGS. 3a-3d is computer 200 of FIG. 2.

The parameters (fill, height, width and thickness) of the rectangle 314 are defined in XAML as follows:

```
<Rectangle Height="100" Fill="Blue" Stroke="White"
StrokeThickness="1" Width="{im:EvalBinding
[RootGrid.Background.Color.B] * [MySlider.Value]}"
/>
(Equation 2)
```

As described in block 106, the EvalBinding object first translates the supplied code expression to a parameter-based representation of the code expression. The code expression is obtained by parsing the SPath strings out of the expression and assigning each an index-based parameter value ({0}, {1}, {2}, etc). The EvalBinding then uses the SPath strings to create a collection of SimplePath objects. The SimplePath objects, in turn, are used to instantiate one-way SimpleBinding objects.

In Equation 2, there are two simple path (SPath) strings: "[RootGrid.Background Color.B]" and "[MySlider.Value]". These SPath strings represent two distinct SimpleBinding objects connected to properties that may be adjusted in response to inputs from the user.

Using the EvalBinding extension shown in Equation 2, the width of a Rectangle 314 expands or contracts to an amount equal to a value (1 to 10) for the position of the slider 316, multiplied by a value (from 1-3) corresponding to one of the colors 306-310 selected. In the following example, the width of the rectangle element 314 is bound to the result of an expression in which the value of the "B" property (1 or 2) on a color 306-310 is multiplied by the value of the "Value" property (1-10) on a slider 316.

Figure 3A:
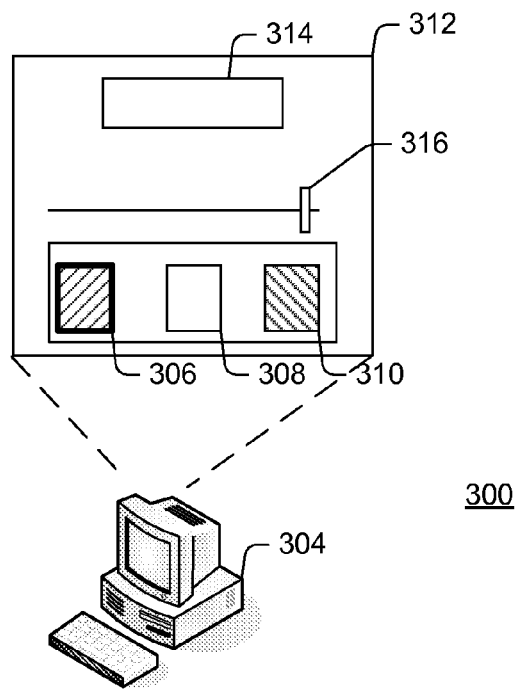
FIGS. 3a-3d are exemplary user interfaces illustrating invocation of an EvalBinding markup extension.

Referring to FIG. 3a, if color 306 is selected that has a "B" value of 1, and if slider 316 were moved to the far right position (value 10), then the width of rectangle 314 would be set to 10 (i.e. 1*10). Referring to FIG. 3b, if the slider was moved to the far left position (value 1), then the width of rectangle 314 would be set to 1.

Figure 3C:
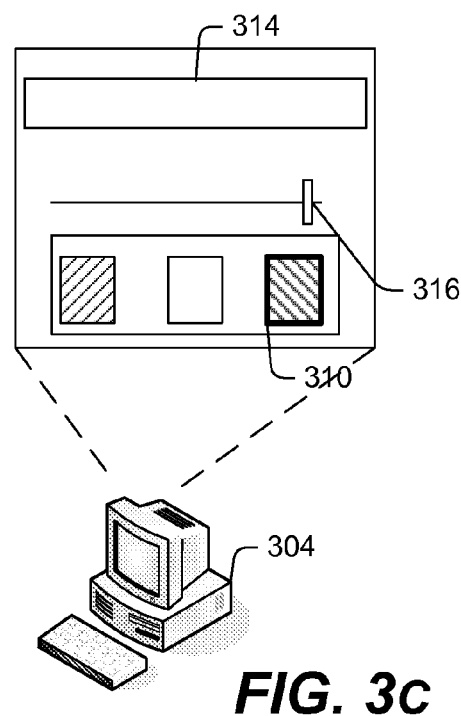
Figure 3B:
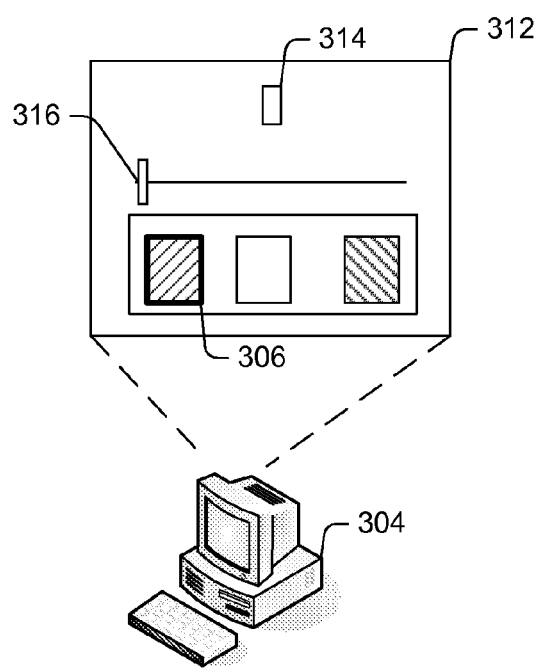
Figure 3D:
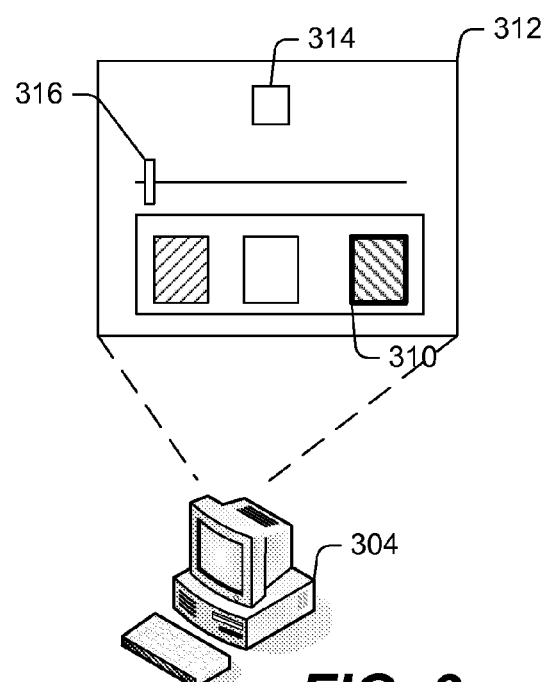

Referring to FIG. 3c, if color 310 is selected that has a "B" value of 2, and if slider 316 were moved to the far right position (value 10), then the width of rectangle 314 would be set to 20 (i.e. 2*10). Referring to FIG. 3d, if the slider was moved to the far left position (value 1), then the width of rectangle 314 would be set to 2.

Nonconventional Uses for the EvalBinding Extension

In addition to establishing an expression-based binding for dependency properties, there are numerous non-conventional uses for the EvalBinding extension. For example, the extension can be used as a debugging tool by creating a code expression that outputs debug information in response to a property change in the value of a sub-binding. The extension can also be used as a Template or Style selector by creating an expression that selects the appropriate Template or Style based on the values of subbindings. In fact, the EvalBinding extension can be used in virtually limitless ways, since it gives the software developer the ability to execute their own CLR-based code as part of markup.

Conclusion

Although the extension has been described in language specific to structural features and/or methodological acts, it is to be understood that the extension defined in the appended claims is not necessarily limited to the specific features or acts described. Rather, the specific features and acts are disclosed as exemplary forms of implementing the claims.

What is claimed:

1. A method executed by a processor for binding a property value of multiple objects to a property value of a target dependency object using an extensible application markup language (XAML) based code expression, the XAML based code expression dependent on one or more Common Language Runtime (CLR) property values of properties included in the XAML based code expression, the method comprising:
   (a) binding the one or more CLR property values of the multiple objects to the property value of the target dependency object using the XAML based code expression evaluated using a JScript interpreter, the XAML based code expression including at least one of (a) a mathematical operation, (b) a string operation, or (c) an arbitrary function call operative to add at least one of a function, a control flow, or a string operation to the XAML based code expression;
   (b) changing the one or more CLR property values of the one or more of the multiple objects; and
   (c) in response to changes in the one or more CLR property values of the one or more of the multiple objects, updating the bound property value of the target dependency object by evaluating the XAML based code expression and at least one of (a) the mathematical operation, (b) the string operation, or (c) the arbitrary function call using the JScript interpreter.

2. The method as recited in claim 1, wherein the bound property value of the target dependency object is a Windows Presentation Foundation (WPF) dependency property value.

3. The method as recited in claim 1 wherein the XAML based code expression includes a code expression in markup inside of a binding; and wherein the binding is evaluated using the JScript interpreter.

4. The method as recited in claim 1 wherein the property values of properties included in the XAML based code expression include a setter, and wherein changes to the one or more CLR property values invokes changes to the setter that results in the bound property value of the target dependency object being updated.

5. The method as recited in claim 1 further comprising:
   binding the one or more of the CLR property values to the XAML based code expression such that changes in multiple CLR property values update the bound property value of the target dependency object.

6. The method as recited in claim 1, wherein the bound property value of the target dependency object is updated by evaluating the XAML based code expression in real time using the JScript interpreter.

7. The method as recited in claim 1, wherein the XAML based code expression includes calls to other functions.

8. The method as recited in claim 7, wherein the calls to other functions by the XAML based code expression are evaluated using the JScript interpreter to update the bound property value.

9. The method as recited in claim 1, wherein the XAML based code expression includes a mathematical operation that combines a first value for one of the multiple objects with a second value for another of the multiple objects, and wherein the XAML based code expression is evaluated by the JScript interpreter to produce a property value of the target dependency object that is a function of the mathematical operation, and wherein the mathematical operation includes a divide operation, a multiply operation, or a subtraction operation.

10. The method as recited in claim 9, wherein the mathematical operation includes operands and one or more operators.

11. The method as recited in claim 1 further comprising:
(d) modifying the XAML based code expression; and
(e) repeating steps (a)-(c) using the modified XAML based code expression as the XAML based code expression.

12. A method executed by a processor for resolving a binding expression for use by an application created to use Windows Presentation Foundation (WPF), the method comprising:
retrieving a markup or code declaration that includes an extensible application markup language (XAML) based code expression, the XAML based code expression including at least one of a mathematical operation, a string operation, or an arbitrary function call operative to add at least one of a function, a control flow, or a string operation to the XAML based code expression;
parsing the retrieved markup or code declaration into a binding object having a parsed XAML based code expression;
creating a converter based on the parsed XAML based code expression evaluated using a JScript interpreter, the JScript interpreter evaluating at least one of: the mathematical operation, the string operation, or the arbitrary function call;
creating a MultiBinding object using the converter, the MultiBinding object containing the parsed expression;
applying the MultiBinding object to a first WPF dependency property such that WPF invokes the created converter to evaluate the parsed expression and produce a result value, the result value being a function of (a) the mathematical operation, (b) the string operation, or (c) the arbitrary function call that is operative to add at least one of a function, a control flow, or a string operation to the XAML based code expression; and
converting the result value into a type understood by the target WPF dependency property.

13. The method as recited in claim 12 wherein the XAML based code expression is parsed into a parsed binding object having a parsed expression and subbindings; wherein the converter is created based on the parsed expression and sub-bindings; wherein WPF resolves the binding expression; and wherein the method further comprises: retrieving input values for the sub-bindings, passing the input values as provided by the subbindings to the converter that evaluates the expression based on the input values, and retrieving the result.

14. The method as recited in claim 12, wherein the XAML based code expression includes a mathematical operation that combines a first value for one of the multiple objects with a second value for another of the multiple objects, and wherein the mathematical operation includes operands and one or more operators.

15. The method as recited in claim 13, wherein the XAML based code expression generates debug information in response to changes the input value of one of the sub-bindings.

16. A non-transitory computer readable medium comprising computer-executable instructions that, when executed by one or more processors, perform acts comprising:
retrieving a markup or code declaration that includes an extensible application markup language (XAML) based code expression, the XAML based code expression including at least one of (a) a mathematical operation, (b) a string operation, or (c) an arbitrary function call operative to add at least one of a function, a control flow, or a string operation to the (XAML) based code expression;
parsing the declaration into a binding object having a parsed expression;
creating a converter based on the parsed expression using a JScript interpreter;
creating a MultiBinding object using the converter and the parsed expression;
applying the MultiBinding object to a target Windows Presentation Foundation (WPF) dependency property such that when WPF invokes the created converter to evaluate the parsed expression, WPF produces a result value that is a function of the at least one of (a) a mathematical operation, (b) the string operation, or (c) the arbitrary function call; and
converting the result value into a type interpretable by the target WPF dependency property.

17. The non-transitory computer readable medium as recited in claim 16 wherein the code expression is parsed into a parsed binding object having a parsed expression and the sub-bindings; wherein the converter is created based on the parsed expression and the sub-bindings; wherein WPF resolves the binding expression; and wherein the processor further performs acts comprising:
retrieving the one or more input values for the subbindings,
passing the one or more input values as provided by the subbindings to the converter that evaluates the expression based on the one or more input values, and
retrieving the result.

* * * * *